//  3,296,198
Patented Jan. 3, 1967

3,296,198
CURABLE ORGANOPOLYSILOXANE COMPOSITIONS

Robert M. Lukes, Louisville, Ky., assignor to General Electric Company, a corporation of New York
No Drawing. Filed July 19, 1965, Ser. No. 473,177
4 Claims. (Cl. 260—46.5)

This invention relates to curable organopolysiloxane compositions and to a process for curing polysiloxanes. More particularly, the present invention relates to a latent catalyst for curing organopolysiloxanes, the catalyst being a triorganoamine oxide.

In the curing of organopolysiloxane compositions, particularly those compositions containing silicon-bonded hydroxyl groups [hereinafter referred to for brevity as "silanol-containing organopolysiloxanes"], both acidic and basic catalysts have been employed. For example, among the common acidic catalysts employed in the curing of these compositions are the metal salts of organic carboxylic acids. While these organic carboxylic acid salts cure reactive organopolysiloxanes, the presence of the acid from the metal salts presents certain problems. For example, in the encapsulation of copper articles, such as printed circuit boards, with these acid-catalyzed resins, it is found that the residue from the catalyst tends to discolor and corrode the surface of the copper, thereby impairing both the appearance and the performance of the encapsulated copper-containing material.

Among the basic catalysts which have been employed for the curing of silanol-containing organopolysiloxanes are the various quaternary ammonium compounds such as benzyl trimethyl ammonium hydroxide and tetramethyl ammonium acetate. While these basic catalysts cure the organopolysiloxanes, their use has presented certain problems. For example, both the quaternary ammonium compounds and the primary amines are difficult to handle because of toxicity problems. Furthermore, these materials often cause such a rapid cure of silanol-containing organopolysiloxane compositions that it is impossible to obtain a uniformly cured material. Thus, with these extremely active basic catalysts, it is difficult to cure thick section materials to a void-free product. Examples of these basic catalysts are shown in U.S. Patent 2,518,160-Mathes.

According to the present invention, it has unexpectedly been discovered that a composition having the formula:

(1) 

where R and R' are each monovalent hydrocarbon radicals, act as curing agents for silanol-containing organopolysiloxanes, but can be kept in the presence of these organopolysiloxanes without significant cure until heated to an elevated temperature for activation. Thus, the materials of Formula 1 act as latent catalysts and can be used to form a composition of silanol-containing organopolysiloxanes and catalyst which has a long pot life. When the composition is heated to the activation temperature, the material is cured in a short period of time to a resinous solid. In the above formula R and R' can be alkyl, e.g., methyl, ethyl, propyl, isopropyl, amyl, etc.; aryl, e.g., phenyl, naphthyl, etc.; alkaryl, e.g., tolyl, xylyl, etc.; and aralkyl, e.g., benzyl, phenethyl, etc.

The organopolysiloxane compositions which can be cured by the catalyst of the present invention include any of the prior art organopolysiloxane compositions containing silicon-bonded hydroxyl groups which have heretofore been cured by metal salts of organic carboxylic acids, quaternary ammonium compounds, or the combination of an epoxy composition and an amine as disclosed and claimed in the copending application of Cohen and Reilly, Serial No. 79,544, filed December 30, 1960, now U.S. Patent 3,205,197, and assigned to the same assignee as the present invention. In general, the silanol-containing organopolysiloxanes contain an average of from about 1.0 to 1.98 organic groups attached to silicon through silicon-carbon linkages, and contain an average of from 0.01 to 1 silicon-bonded hydroxyl group per silicon atom. Alternately, some of the silicon-bonded hydroxyl groups can be replaced with alkoxy groups provided that the composition contains a minimum of 0.01 hydroxyl group per silicon atom. These compositions can be described as having the average formula:

(2) 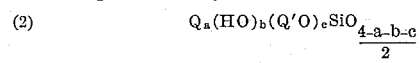

where Q is a monovalent hydrocarbon radical or a substituted monovalent hydrocarbon radical, Q' is a lower alkyl radical containing from 1 to 8 carbon atoms, $a$ has a value of from 1.0 to 1.98, $b$ has a value of from 0.01 to 1, $c$ has a value of from 0 to 0.99, the sum of $b+c$ is from 0.01 to 1, and the sum of $a+b+c$ is from 1.01 to 2.1. Included among the radicals represented by Q are, for example, alkyl radicals, e.g., methyl, ethyl, propyl, butyl, octyl, decyl, etc.; aryl radicals, e.g., phenyl, naphthyl, xylyl, tolyl, etc.; aralkyl radicals, e.g., benzyl, phenethyl, styryl, etc.; alkenyl radicals, e.g., vinyl, allyl, etc.; cycloaliphatic hydrocarbon radicals, e.g., cyclohexyl, cycloheptyl, cyclohexenyl, etc.; cyanoalkyl radicals, e.g., cyanoethyl, cyanomethyl, cyanopropyl, etc.; halogenated monovalent hydrocarbon radicals, e.g., chloromethyl, bromophenyl, chloroethyl, chlorophenyl, tetrachlorophenyl, dibromophenyl, etc. In the preferred embodiment, at least 50% of the total radicals represented by Q are methyl radicals.

While Formula 2 is an average formula for the silanol-containing organopolysiloxanes used in the present invention, it should be remembered that this average formula can represent a mixture of two or more different types of organopolysiloxanes, so long as each of the organopolysiloxanes which comprise the mixture contains at least two silicon-bonded hydroxyl or alkoxy groups per molecule. The presence of at least two silicon-bonded hydroxyl or alkoxy groups in each molecule is required so that condensation can occur between each of the molecules in the mixture forming the average composition of Formula 2.

The silanol-containing organopolysiloxanes of Formula 2 comprise a broad class of well-known organopolysiloxane compositions. Included within the scope of this formula are various resinous organopolysiloxanes including those resinous materials described in Patents 2,258,218 through 2,258,222—Rochow. The resinous organopolysiloxanes of the aforementioned Rochow patents are prepared by hydrolyzing one or more organochlorosilanes containing an average of from 1.0 to about 1.9 organic groups per silicon atom. During this hydrolysis reaction, the silicon-bonded chlorine atoms of the organochlorosilanes are hydrolyzed to form silanes containing silicon-bonded hydroxyl groups. Some of these hydroxyl groups are condensed with others to eliminate water and form siloxane linkages. Other of the silicon-bonded hydroxyl groups remain intact and the resulting product is an organopolysiloxane resin containing silicon-bonded hydroxyl groups. For some applications it is desirable to "body" this partially condensed resinous product to condense additional silicon-bonded hydroxyl groups to siloxane groups, thereby reducing the number of silicon-bonded hydroxyl groups in the resinous product, but not completely eliminating these groups. These resinous materials in the aforementioned states of condensation are those that are curable by the curing agents of the present invention. For a specific illustration of a group of organopolysiloxane resins containing silicon-bonded hydroxyl groups, reference is made to U.S. Patent 2,906,734—Clark.

Organopolysiloxane compositions within the scope of Formula 2 containing both silicon-bonded hydroxyl and alkoxy groups can be prepared by a number of methods. For example, a mixture of various organochlorosilanes can be hydrolyzed with water and partially condensed to produce an organopolysiloxane containing silicon-bonded hydroxyl groups. In general, this hydrolysis and condensation is effected by adding the mixture of organochlorosilanes to a mixture of water and an organic solvent, such as toluene, and agitating the mixture. The resulting organopolysiloxane containing silicon-bonded hydroxyl groups is found in the organic solvent phase which is separated from the aqueous phase. A suitable alcohol, such as an alkanol containing from 1 to 8 carbon atoms, is then added to the organopolysiloxane-organic solvent solution and heated at an elevated temperature, during which time the alkoxy groups replace some or most of the hydroxyl groups on the silicon atoms. A still further method of preparing organopolysiloxanes containing both silicon-bonded hydroxyl and alkoxy groups is by condensing a mixture of organoalkoxysilanes with water to cause hydrolysis of a portion of the silicon-bonded alkoxy groups to hydroxyl groups and condensation of some of the hydroxyl groups.

Other organopolysiloxanes within the scope of Formula 2 are the resinous organopolysiloxanes composed of $Q_3SiO_{0.5}$ units and $SiO_2$ units, where Q is as previously defined, in the ratio of from 0.5 to 1.0 $Q_3SiO_{0.5}$ unit per $SiO_2$ unit, which resinous copolymers are described in Patents 2,736,721—Dexter, 2,814,601—Currie, and 2,857,356—Goodwin. These copolymers are prepared by hydrolyzing a hydrolyzable triorganosilane, such as trimethylchlorosilane, with an alkyl orthosilicate, such as ethyl orthosilicate or the partial hydrolyzate of such alkyl orthosilicate. During the cohydrolysis of these two materials in the presence of a minor amount of water, the silicon-bonded chlorine and most of the silicon-bonded alkoxy groups are replaced by silicon-bonded hydroxyl groups through which the two organosilicon materials condense to form siloxane linkages.

Other compositions within the scope of Formula 2 which are applicable in the present invention are the mixtures of 0.2 to 5 parts by weight of a copolymer of $$Q_3SiO_{0.5}$$

units and $SiO_2$ units with one part by weight of a polydiorganosiloxane containing silicon-bonded hydroxyl or alkoxy groups at the ends of the chains, such materials being disclosed in part in the aforementioned Dexter and Currie patents. Still another type of organopolysiloxane within the scope of Formula 2 is the material described in the aforementioned Goodwin patent which comprises the reaction product of hydroxyl chain-stopped polydiorganosiloxane and the aforementioned copolymer of $Q_3SiO_{0.5}$ units and $SiO_2$ units.

A still further type of organopolysiloxane within the scope of Formula 2 which can be cured by the amine oxide of Formula 1 is the room temperature curing organopolysiloxane composition described and claimed in Patent 2,843,555—Berridge, which composition comprises a hydroxyl chain-stopped polydiorganosiloxane and an alkyl orthosilicate or a partial hydrolyzate of the alkyl orthosilicate. Instead of employing the alkyl orthosilicate or its hydrolysis product in the composition of the Berridge patent, the composition can contain a hydroxy alkyl orthosilicate or partial hydrolysis product thereof.

In carrying out the process of the present invention to form a curable organopolysiloxane composition and to cure the composition, the silanol-containing organopolysiloxane of Formula 2, along with various fillers or stabilizing agents, where such extra materials are desired, are merely mixed with an amine oxide of Formula 1. To initiate cure, this mixture is heated to a point sufficient to activate the curing agent, for example, about 100° C. in the case of N,N-dimethylbenzylamine oxide, for a period of about 30 minutes to one or more hours. While the exact mechanism of the curing reaction is not known with certainty, it is believed that the amine oxide of Formula 1 rearranges, on heating to form an alkoxy amine which acts, at this elevated temperature, as the curing agent. While I do not wish to be bound by theory, it is my belief that at the elevated temperature employed, the amine oxide of Formula 1 rearranges according to the following equation:

(3) 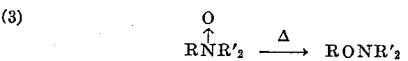

where R and R' are as previously defined.

Since the amine oxide is relatively insoluble in the silanol-containing organopolysiloxanes of Formula 2, it is necessary to heat a mixture of the amine oxide and the organopolysiloxane at a temperature of from about 80° to 110° C. for from 5 to 10 minutes to effect solution of the amine oxide in the silanol-containing organopolysiloxane. This is sufficient to dissolve the amine oxide without activating it. Following the heating to effect solution, the mixture can be stored for considerable periods of time, for example, up to about one week, without curing, or heating of the mixture can be continued at from about 100° C. to 120° C. to effect cure in from about 30 minutes to one hour. When the silanol-containing organopolysiloxane is present as a solution of the organopolysiloxane in an organic solvent, it is often desirable to add the amine oxide of Formula 1 to the solvent solution and accomplish solution of the amine oxide in the organopolysiloxane while distilling the organic solvent from the solution. The distillation may be effected under reduced pressure so as to prevent activation of the amine oxide catalyst. Solvents in which various silanol-containing organopolysiloxanes are often found include toluene, xylene, mineral spirits, butanol, isopropanol, etc.

Where fillers or extenders are desired to be used with the silanol-containing organopolysiloxanes of Formula 2, these fillers or extenders are merely added to the organopolysiloxanes in accordance with the procedures known in the prior art. Suitable fillers and extenders for use in these organopolysiloxane compositions include various finely divided silicas, such as fumed silica, precipitated silica, and silica aerogel. Also useful as fillers are carbon black, diatomaceous earth, calcium carbonate, finely divided mica, fuller's earth, etc. Often, mixtures of two or more different fillers or extenders are added to these organopolysiloxane compositions. These fillers or extenders are usually employed in an amount equal to about 20% to 200%, based on the weight of the organopolysiloxane. When the organopolysiloxane compositions contain these fillers or extenders, the fillers or extenders and the amine oxide can be added to the organopolysiloxane simultaneously or in any order desired.

The amount of the amine oxide which should be incorporated for curing the silanol-containing organopolysiloxanes can vary within extremely wide limits. It has been found, however, that satisfactory rates of curing are obtained when the amine oxide is present in an amount of from about 0.1 to 10%, by weight, based on the weight of the organopolysiloxane. Higher percentages of this curing agent can be employed, but without significant beneficial effect.

The following examples are given as illustrations of the practice of the present invention. These examples should not be considered as limiting in any way the full scope of the invention as covered in the appended claims.

*Example 1*

A resinous copolymer was prepared by the procedure of the aforementioned Goodwin patent by reacting trimethylchlorosilane and ethyl orthosilicate to form a copolymer of trimethylsiloxane units and $SiO_2$ units in which the ratio of trimethylsiloxane units to SiO₂ units was about 0.5 to 1. A solution was formed of 50 parts of this copolymer and sufficient xylene to provide a solution containing 60% solids. A quantity of 83.5 parts of this solution was mixed with 300 parts of a silanol chain-stopped dimethylpolysiloxane having a viscosity of about 3500 centipoises when measured at 25° C. The resulting solution was then heated at a temperature of about 55° C., at a reduced pressure of about 20 mm., for 5 hours, while the xylene content of the mixture was reduced to about 0.5%, based on the weight of the total mixture. The resulting material had a viscosity of about 3500 centipoises when measured at 25° C. and contained 0.1%, by weight, of hydroxyl groups.

A mixture was prepared containing 20 parts of the material described above and 0.1 part of N,N-dimethylbenzylamine oxide. This mixture was uniformly heated to 100° C. and, after 45 minutes, a cured resinous material resulted.

*Example 2*

A solution was prepared containing 10 parts of the copolymer described in Example 1 and 0.5 part of N,N-dimethylbenzylamine oxide. This mixture was heated at 100° C. for a period of 5 minutes, while rapidly stirring, to effect dissolution of the amine oxide in the silanol-containing organopolysiloxane. The solution was then degassed, under vacuum, for 5 minutes and was subsequently diluted with 90 additional parts of the copolymer described in Example 1. The new mixture was stirred and degassed, under vacuum, for 10 minutes.

The mixture was divided into two 50 part portions which were capped and allowed to stand. Both portions remained liquid at room temperature when observed after 48 hours. At that time, one of the portions was heated for 1 hour at 100° C. and resulted in a cured resinous material. The second portion was allowed to remain at room temperature for an additional 96 hours and was still essentially a liquid, showing the long pot life of a resinous material containing an amine oxide catalyst.

*Example 3*

A quantity of 150 parts of a solid resinous copolymer containing an average of 1 trimethylsiloxy unit per SiO₂ unit was dissolved in sufficient toluene to provide a 60% solid solution. A quantity of 250 parts of this solution was mixed with 250 parts of a silanol chain-stopped dimethylpolysiloxane having a viscosity of 500 centipoises when measured at 25° C. This solution was heated to 65° C. and maintained under a vacuum of about 100 mm. for three hours, while substantially all of the toluene solvent was removed, leaving a clear fluid with a viscosity of about 500 centipoises and containing about 1% by weight, of hydroxyl groups.

A mixture was prepared containing 50 parts of the copolymer described above and 0.25 part of N,N-dimethylbenzylamine oxide. The mixture was warmed to 50° C. and stirred to dissolve the amine oxide in the organopolysiloxane, and the mixture was then degassed under vacuum. The resulting solution was cast around a printed circuit board and the entire cast assembly was maintained in a circulating air oven at a temperature of 100° C. for bout two hours. At the end of this time, the organopolysiloxane is cured to a firm, rubbery, transparent gel with sufficient resiliency to protect the assembly from mechanical shock and vibration.

It should be understood that my invention is directed broadly to the use of amine oxides having the composition of Formula 1 in curing organopolysiloxanes with silicon-bonded hydroxyl groups. The organopolysiloxane compositions cured with a curing agent of the present invention have the same utility as similar organopolysiloxanes cured by other methods known in the art. Thus, these materials can be employed as varnish for impregnating electrical apparatus, as insulation for electrical conductors, as gasket materials, and as potting compounds for electrical and electronic apparatus.

What I claim as new and desire to secure by Letters Patent of the United States is:

1. A curable organopolysiloxane composition consisting essentially of (1) a silanol-containing organopolysiloxane having the formula:

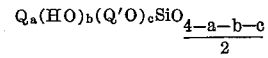

where Q is a member selected from the class consisting of monovalent hydrocarbon radicals, halogenated monovalent hydrocarbon radicals, and cyanoalkyl radicals, Q' is a lower alkyl radical, $a$ has a value of from 1.0 to 1.98, inclusive, $b$ has a value of from 0.01 to 1, inclusive, $c$ has a value of from 0 to 0.99, the sum of $b+c$ is from 0.01 to 1, inclusive, and the sum of $a+b+c$ is from 1.01 to 2.1, inclusive, and (2) from 0.1 to 10 percent by weight, based on the weight of said organopolysiloxane, of an amine oxide having the formula:

where R and R' are selected from the class consisting of monovalent hydrocarbon radicals.

2. The composition of claim 1 wherein the amine oxide is N,N-dimethylbenzylamine oxide.

3. A curable composition consisting essentially of:
(1) an organopolysiloxane having the formula:

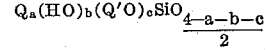

where Q is a member selected from the class consisting of monovalent hydrocarbon radicals, halogenated monovalent hydrocarbon radicals, and cyanoalkyl radicals, Q' is a lower alkyl radical, $a$ has a value of from 1.0 to 1.98, inclusive, $b$ has a value of from 0.01 to 1, inclusive, $c$ has a value of from 0 to 0.99, the sum of $b+c$ is from 0.01 to 1, inclusive, and the sum of $a+b+c$ is from 1.01 to 2.1, inclusive, and (2) an amine oxide having the formula:

where R and R' are each selected from the class consisting of monovalent hydrocarbon radicals.

4. The composition of claim 3 wherein the amine oxide is N,N-dimethylbenzylamine oxide.

References Cited by the Examiner

UNITED STATES PATENTS

| | | | |
|---|---|---|---|
| 2,518,160 | 8/1950 | Mathes | 260—46.5 |
| 2,955,127 | 10/1960 | Pike | 260—46.5 |
| 3,032,528 | 5/1962 | Nitzsche et al. | 260—448.2 |
| 3,160,601 | 12/1964 | Hyde | 260—46.5 |

LEON J. BERCOVITZ, *Primary Examiner.*

DONALD E. CZAJA, *Examiner.*

M. I. MARQUIS, *Assistant Examiner.*